UNITED STATES PATENT OFFICE.

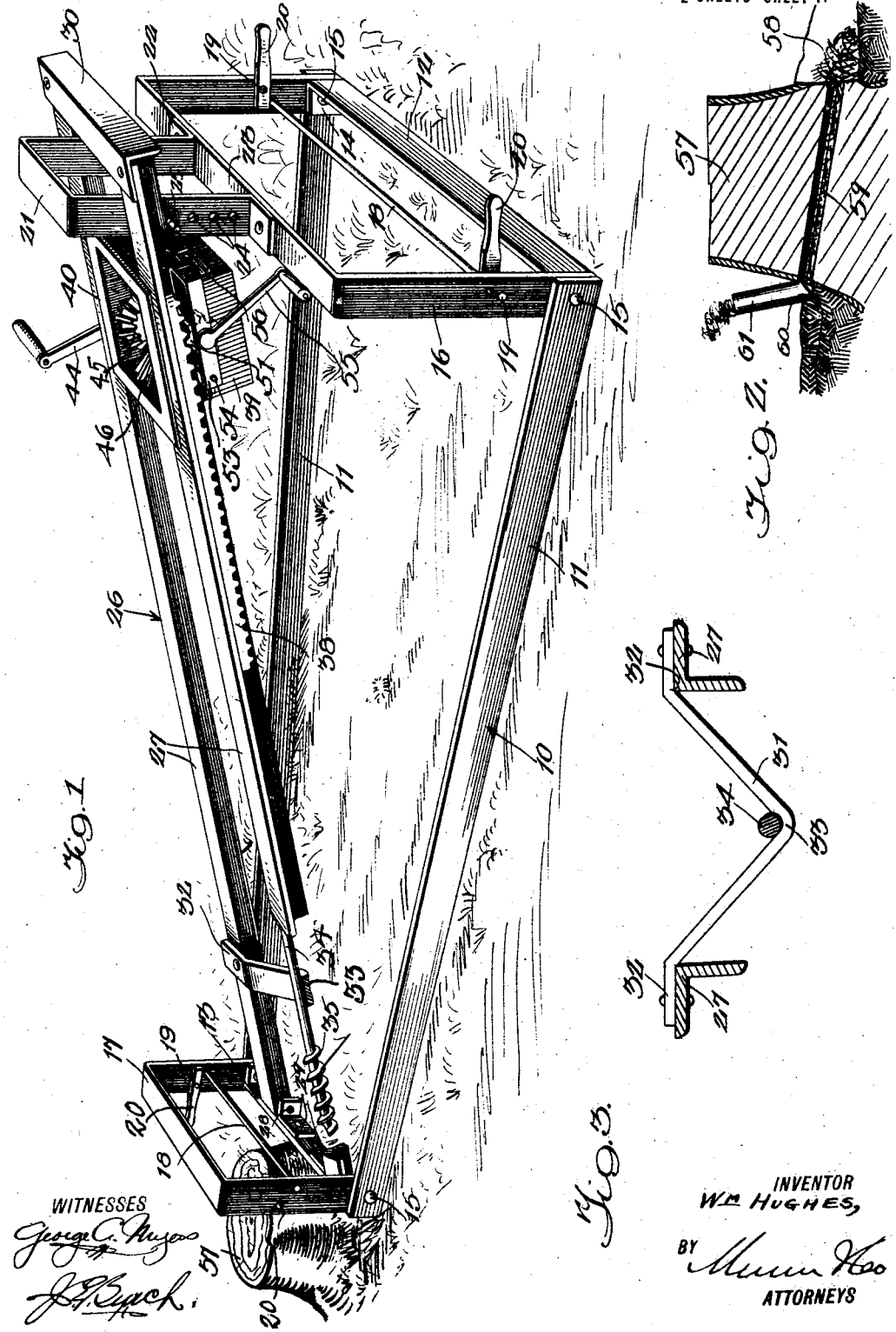

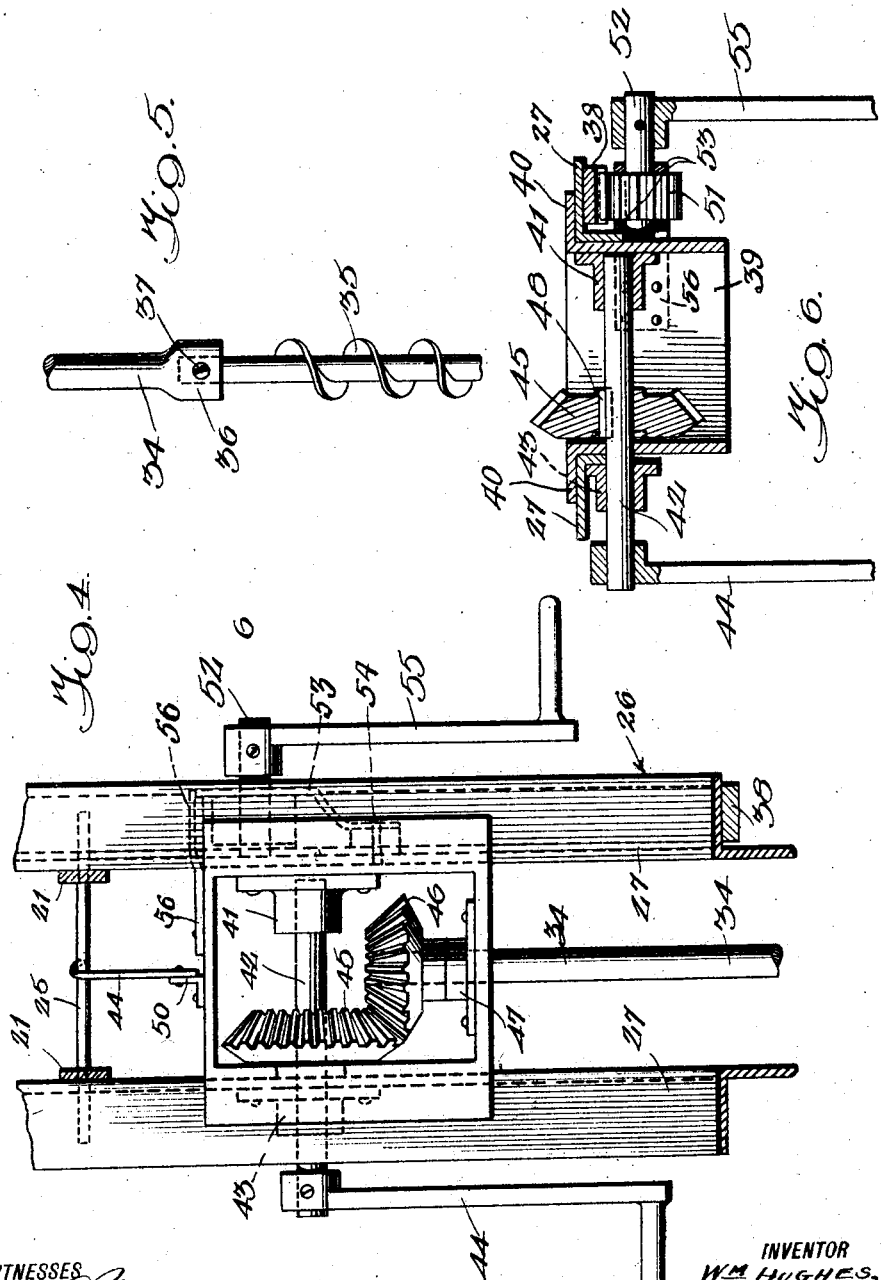

WILLIAM HUGHES, OF MERIDIAN, MISSISSIPPI.

STUMP AUGER.

1,411,104. Specification of Letters Patent. Patented Mar. 28, 1922.

Application filed February 16, 1921. Serial No. 445,419.

*To all whom it may concern:*

Be it known that I, WILLIAM HUGHES, a citizen of the United States, and a resident of Meridian, in the county of Lauderdale and State of Mississippi, have invented certain new and useful Improvements in Stump Augers, of which the following is a specification.

This invention relates to stump augers and method of destroying or removing stumps from land in a simple and effective manner, such as by burning or blasting. It is also an object of the invention to provide a machine with which every farmer may be furnished or equipped and which constitutes efficient means for ridding the field or land of stumps easily and cheaply, by either burning or blasting, thus doing away with the old back breaking method of digging them out by hand, or other inefficient or expensive method or apparatus that is now employed.

A further object of the invention is to provide an improved portable and collapsible construction capable of being readily transported, operated and adjusted and in which the feeding of the auger can be readily controlled and operated to remove shavings from the hole bored thereby to facilitate the operation of the device, so as to free both the auger and the hole of shavings. The device is capable of being readily and compactly folded for shipment, is economical to produce, durable in use, and reliable, as well as easy to operate.

Other and further objects of my invention will become readily apparent from a consideration of the following description, when taken in conjunction with the accompanying drawings, wherein Figure 1 is a perspective view of the device, showing the manner of use.

Figure 2 is a sectional elevation showing the stump acted on by the device, and the method of burning or destroying the same.

Figure 3 is a transverse sectional view illustrating the manner of supporting the operative end of the auger or bit.

Figure 4 is a fragmentary sectional plan view showing the operating and feeding means.

Figure 5 is an enlarged detail of the auger or bit, and

Figure 6 is a transverse sectional view taken on the section line 6—6 of Figure 4.

Referring to the drawings in detail, in which like reference characters designate corresponding parts throughout the several views, 10 designates a base frame formed of strips of metal, including the side members 11 and the end members 12 and 13 forming a base tapered toward the forward end 13, said frame being about two feet wide at the rear and about 18 inches at the front end and arranged to set upon the ground. The ends of the end members 12 and 13 are directed inwardly at right angles in the same direction as shown at 14 and pivotally or otherwise loosely connected to the extremities of the side members 11 at opposed sides of the frame, as indicated at 15 with the interposed lower extremities of the side portions of two inverted U-shaped end frames 16 and 17 pivoted therebetween on the pivots 15 and arranged to be swung from vertical to horizontal positions within the sides 11 of the base frame 10 on said pivot, as it is thought will readily appear from an inspection of the drawings.

The end members 16 and 17 are thus arranged to be disposed in vertical positions or to fold downwardly in compact relation to the base plate 10 at the ends thereof, the horizontal connecting portions thereof serving to brace the frame and for other purposes, as will hereinafter appear. Connecting the sides of the frames 16 and 17 are brace rods 18 and pivoted to the leg portion or sides of the frames 16 and 17, preferably at the inside, and parallel to the plane of each side as shown at 19, are handles 20, the inner ends of which project over the rods 18 and below the pivots and handles so as to brace the handles in outwardly extending horizontal positions for use in transporting or carrying the device from place to place or stump to stump as it is thought will be readily understood. The frame as shown, is preferably about two and one-half feet high at the rear and fifteen inches high at the front, the essential feature being that the frame is higher at the rear than at the front, in addition to being tapered toward its forward end which is disposed adjacent to the stump when the device is in use. It will also be observed that the transverse pivots 15 opposite are disposed in alignment, thus insuring proper movement of the end frames 16 and 17 in downwardly and opposite directions toward each other and in alignment with the sides of the base frame 10 or when extended vertically parallel to each other at the opposed ends of the device. The handles 20 are adapted to fold downwardly from the positions shown in Figure 1, the inner extremities or projections beyond the pivots 19 moving out of contact with the transverse brace rods 18 so as to dispose the handles 20 in alignment with the end frames 16 and 17 when the latter are folded as stated. Arranged upon the top of the end frame 16 formed by the cross connection or bight portion thereof is an inverted U-shaped bracket 21, the same preferably having the lower extremities of its sides or leg portions directed outwardly and apertured to form attaching portions 22 which are riveted or otherwise secured to the top portion 23 of said frame 16 intermediately of the sides thereof. The bracket 21 is considerably narrower than the end frame 16 and has its opposed sides formed with spaced apertures 24 arranged in vertical rows to receive a cross pin 25 of such length than the extremities thereof will project outwardly beyond the sides of the bracket 21 for a purpose to be hereinafter explained.

Pivoted to the forward end of the frame 11 is an upper or auxiliary frame 26 comprising side members 27 preferably of angle iron with a vertical inner flange and a horizontal top flange, said top flanges extending outwardly in opposite directions and the forward ends of the vertical flanges being pivoted for vertical swinging movement about horizontal pivots 28 of outstanding or rearwardly projecting end portions of angle brackets 29 secured to the inner face of the cross piece or end member 13. The angular brackets 29 are of right angular formation, and the forward ends of the side members 27 are so formed as to permit free pivotal movement clear of the front end member or cross beam 13 so as to permit the frame 26 to be lowered within the frame when the parts are folded or collapsed, or to be raised and supported at different positions or angles of inclination straddling the bracket 21 and supported by the pin 25 with which the lower edges of the vertical flanges of the side members 27 engage. A cross member of angle iron, indicated at 30, connects the rear ends of the sides 27, thus holding said sides in fixed relation to each other in connection with the pivotal mounting above referred to.

A substantially V-shaped hanger 31 connects the sides 27 near but at a spaced distance from the forward ends thereof, said hanger having its horizontal end portions 32 riveted or otherwise secured to the horizontal flanges of the sides 27 and having its bight portion 33 centrally located between said sides and forming a bearing for the forward portion of an auger shaft or bit shank 34 extending centrally and longitudinally of the auxiliary frame at a corresponding inclination and having a bit 35 at the forward end thereof. The shaft and bit may be formed in one as shown in Figure 1 of the drawings, or there may be provided a socket 36 in which the bit shank is held through the medium of a set screw 37 threaded through the wall of the socket. The latter construction is preferable, as the bit may be removed and replaced as desired or necessary. Mounted or secured beneath the top flange of one side member 27 is a downwardly facing rack or rack bar 38, of suitable length, along the upper portion of the frame 26.

Movably or slidably mounted upon the upper or auxiliary frame 26 for longitudinal adjustment thereon is a bearing box 39, the same having flanges at the sides, as indicated at 40, resting on the top flanges of the sides 27, while the box proper fits between the vertical flanges and extends below the frame 26 while being permitted to freely slide or move along the frame. A bearing socket 41 is secured to the inner face of one side of the bearing box 39 and rotatably receives the adjacent end of a transverse drive or crank shaft 42 which extends through the opposite side of the box and a bearing sleeve 43 secured to the outer face thereof, said shaft having on its projecting end an operating crank handle 44, detachable as shown. Fixed to the shaft 42 is a beveled or miter gear 45 meshing with a smaller gear 46 fixed to the upper end of the shaft 34 adjacent thereto, said latter shaft, as well as the shaft 42 extending transversely at right angles to the shaft 34, having the sleeve extensions or hubs of the gears fixed thereto. In order to hold the gears in proper mesh, a sleeve 47 corresponding to the sleeve 43, is also provided with a plate portion which is secured to the inner face of the forward portion of the bearing box 39 and is contacted by the hub of the gear 46 so that the shaft 34 is retained in position against longitudinal displacement or end thrust. Of course, the gear 45 may be otherwise fixed to the shaft 42, and as shown in Figure 6 may be keyed as indicated at 48. Thus it will appear that by turning the crank handle 44, rotation may be imparted to the auger in either direction to extrude or retract the same.

The operating parts, including the journal box will tend to move downwardly and forwardly automatically, the sides and flanges of the frame 26 and bearing box 39 being lubricated if desired or necessary. Thus it is necessary to provide means for holding the parts in an upward position with the auger retracted, and for this purpose, a hook 49 is mounted at the top of the bearing box, being pivoted to a right angular bracket 50 carried centrally thereon and adapted to engage the rod or pin 25, said hook being sufficiently rigid on its pivot and it will automatically engage said pin assisted by the resiliency thereof so that when the device is not in use, the bearing box is moved upwardly or pulled back until the hook strikes and automatically locks or engages with the pin so as to hold the parts in place. When the device is released by disengagement of the hooks, it starts to move downwardly at once and thus its feeding operation must be manually controlled, as the auger should never be turned loose, but lowered gently until it contacts with the wood, since the track formed by the side 27 of the upper or auxiliary frame 26 and the carrier and particularly the side flanges 40 of the box 39 forming the same are preferably of polished steel.

However, means are provided for use in conjunction with the rack bar 38 in order to retract the cutting tool upon the forward end of the shaft 34, especially adapted for use when the auger is used at a nearly horizontal position and may need more force than gravity in order to feed the same. For this purpose, a pinion 51 is fixed to the short transverse shaft 52 journaled through the opposed sides of a hanger frame 53 pivoted for vertical swinging movement to the left hand side of the box 39 as indicated at 54 in a position to engage the teeth of a rack 38 when raised so that by turning the pinion 51 and shaft 52 through the medium of a crank handle 55 secured to the shaft, the device may be adjusted longitudinally in either direction. The frame is adapted to be held in a raised or operative position by a spring latch 56 secured to the upper side of the carriage or journal box 39 at its inner end and displaceable at its outer end for supporting said hanger frame or permitting the same to be swung downwardly whereby to disengage the pinion from the rack when the feeding device is not in use. This arrangement may be used as desired and may be omitted in practice.

In Figure 2 of the drawings, the method of destroying or burning is shown, the stump designated at 57 in Figures 1 and 2 being operated on by first digging a hole about 18 inches deep at one side of the stump as shown at 58. The machine is then carried as previously described by two men, one at each end grasping the handles 20 and placed on the opposite side of the stump from that at which the hole is provided. The machine is then operated after releasing the hook 49 or by any other suitable boring apparatus and a hole of suitable diameter, preferably about one and one-half inches, is bored from the side opposite the hole as indicated at 59 at a short distance, preferably about two inches below the surface of the earth as indicated at 60, downwardly at an angle of from twenty to forty degrees to the hole forming an excavation at the opposite side striking it about five inches above the bottom. A fire is then built in the hole 58 and the auger hole 59 will act as a chimney so that the stump will burn out in a few hours. In the case of such stumps as gum, sycamore and such varieties it will be advisable to set a joint of stove pipe over the upper end at the hole 60 as indicated at 61 in order to give more draft. For blasting, it will only be necessary to bore two-thirds way through the stump in order to have the blasting material in the center. When the auger has entered the stump from twelve to fourteen inches, it must be withdrawn to free both the auger and the hole of shavings. The auger should never be turned loose, but lowered gently until it contacts with the wood, thereby preventing injury to the cutting tool. It will also be apparent that various sizes and shapes of drills or cutting tools may be employed on the device and that I am not limited to the exact construction shown, inasmuch as changes in the various details of construction and proportion, as well as arrangement of parts, may be made within the scope of the invention as clearly set forth and defined by the appended claims. However, it may be stated that in order to pack and ship the device, the track and auger are raised from the position shown in Figure 1, the track and auger being laid on top of the rear support when pressed forwardly and downwardly. The machine is then folded in compact form and may be easily crated so as to occupy a minimum amount of space.

In view of the foregoing, it is thought that the operation of the device will be readily understood and in view of the simplicity and practical value, that it will readily commend itself to those skilled in the art.

Having thus described my invention, what I claim is:—

1. In a stump auger, a base frame comprising side members and end members pivotally connected, inverted U-shaped end frames pivoted at the extremities of their leg portions to the ends of the base frame, an auxiliary frame comprising spaced side members pivoted at their forward ends to the forward end member and a cross member connecting the same at their rear ends, an inverted U-shaped bracket mounted upon the rear end frame and having vertically adjustable supporting means projecting from the sides thereof, the sides of the auxiliary frame being adapted to rest upon said supporting means, a bearing block positioned between the sides of the auxiliary frame and having top flanges engaging upon said side portions of the auxiliary frame for movement longitudinally thereof, a bit journaled in said box, means for rotating the bit, and a hanger connecting the side portions of the auxiliary frame upon which the shank of the bit is adapted to turn.

2. In a stump auger, a base frame comprising side members and end members pivotally connected, inverted U-shaped end frames pivoted at the extremities of their leg portions to the ends of the base frame, an auxiliary frame comprising spaced side members pivoted at their forward ends to the forward end member and a cross member connecting the same at their rear ends, transverse brace rods connecting the sides of the end frame, handles pivoted to said side portions above said rods and having inwardly projecting portions adapted to overlie the rods to brace the handles in outwardly extending positions for use, an auger bit rotatably mounted longitudinally of the auxiliary frame, means for slidably supporting the same upon the auxiliary frame, means for rotating said bit and carried by said supporting means, and a V-shaped hanger straddling the sides of the auxiliary frame near the forward ends of the side portions upon which the shank of the bit rests.

3. In a stump auger, a base frame comprising side members and end members pivotally connected, inverted U-shaped end frames pivoted at the extremities of their leg portions to the ends of the base frame, an auxiliary frame comprising spaced side members pivoted at their forward ends to the forward end member and a cross member connecting the same at their rear ends, an inverted U-shaped brace mounted upon the rear end frame and having vertical side portions spaced from the sides of said rear end frame, said side portions having vertical rows of apertures, a rod extending transversely through said apertures and projecting from the sides of the bracket, the sides of the auxiliary frame being adapted to rest on said rod and to permit angular adjustment thereof, a bit mounted longitudinally of the auxiliary frame and having apertures at the forward end thereof, and means for rotating the bit.

4. In a stump auger, a base frame comprising side members and end members pivotally connected, inverted U-shaped end frames pivoted at the extremities of their leg portions to the ends of the base frame, an auxiliary frame comprising spaced side members pivoted at their forward ends to the forward end member and a cross member connecting the same at their rear ends, said auxiliary frame comprising angle iron sections having vertical inner portions and horizontal top portions, means carried upon the rear end frame for supporting said auxiliary frame for vertical angular adjustment at said inner portion, a rectangular bearing box fitted between and depending from the sides of the auxiliary frame and having top flanges resting upon the top portions thereof for longitudinal movement, a crank shaft journaled transversely through the box beneath the sides of the auxiliary frame, a shaft geared thereto and running longitudinally of the auxiliary frame equi-distantly between its sides, a bit at the forward end of the longitudinal shaft, a hanger supporting the forward end of the longitudinal shaft from the sides of the auxiliary frame for operation of the bit below the base frame at the forward end of the latter, at the rear and upper end of the auxiliary frame, said means being releasable and means for advancing the box and bit when in operation, said latter means being disengageable to permit the box and bit to be shifted independently of the advancing means.

5. In a stump auger, a base frame comprising side members and end members pivotally connected, inverted U-shaped end frames pivoted at the extremities of their leg portions to the ends of the base frame, an auxiliary frame comprising spaced side members pivoted at their forward ends to the forward end member and a cross member connecting the same at their rear ends, said auxiliary frame comprising angle iron sections having vertical inner portions and horizontal top portions, means carried upon the rear end frame for supporting said auxiliary frame for vertical angular adjustment at said inner portion, a rectangular bearing box fitted between and depending from the sides of the auxiliary frame and having top flanges resting upon the top portions thereof for longitudinal movement, a crank shaft journaled transversely through the box beneath the sides of the auxiliary frame, a shaft geared thereto and running longitudinally of the auxiliary frame equi-distantly between its sides, a bit at the forward end of the longitudinal shaft, a hanger supporting the forward end of the longitudinal shaft from the sides of the auxiliary frame for operation of the bit below the base frame at the forward end of the latter, at the rear and upper end of the auxiliary frame, said means being releasable, a rack bar mounted beneath one side portion of the auxiliary frame with the teeth thereof disposed downwardly, a U-shaped hanger frame pivoted upon the adjacent side of the bearing box for vertical swinging movement, a crank shaft journaled through the sides of said hanger frame, a pinion fixed thereto within the frame and adapted to engage the rack bar whereby the bearing box may be advanced or retracted upon rotation of the shaft, and means to hold the hanger frame in a raised position with the pinions in engagement with the rack, said latter means permitting the release of the hanger frame and disengagement of the pinion whereby the bearing box and bit may be independently moved with respect to the advancing and retracting means.

6. In a stump auger, a base frame, an auxiliary frame pivoted thereto at one end, means for supporting and holding the auxiliary frame in adjusted position angularly with respect to the main frame, a cutting tool carried by the auxiliary frame and operative at the lower end thereof, and means at each end of the frame for transporting the device, said latter means comprising end frames carried by the base frame, one of said end frames comprising a portion of said first named means, and extensible handles carried by the end frames and foldable within the same or extensible therefrom.

7. In a stump auger, a base frame comprising side members disposed vertically on edge, end members having inturned end portions pivotally connected to the ends of the side members, U-shaped end frames having their extremities pivoted between the ends of the side members and the extremities of the end members for movement to vertical positions or toward the base frame in a collapsed position, an auxiliary frame comprising side portions pivoted to the forward end member, and adapted for angular adjustment toward and away from the rear end member, transporting means carried by said end frames, means carried by the rear end frame for adjustably supporting the auxiliary frame, and a cutting tool mounted centrally and longitudinally of the auxiliary frame to extend beneath the forward end member and movably supported upon the auxiliary frame.

8. In a stump auger, a base frame comprising side members disposed vertically on edge, end members having inturned end portions pivotally connected to the ends of the side members, U-shaped end frames having their extremities pivoted between the ends of the side members and the extremities of the end members for movement to vertical positions or toward the base frame in a collapsed position, an auxiliary frame comprising side portions pivoted to the forward end member, and adapted for angular adjustment toward and away from the rear end member, transporting means carried by said end frames, means carried by the rear end frame for adjustably supporting the auxiliary frame, a bearing box movably mounted upon the side members of the auxiliary frame and extending below said side members, a shaft journaled through one side of the bearing box beneath the adjacent side member for free movement with respect thereto and serving in connection with the top of the box resting upon said side members to retain the box against displacement, a shaft mounted for rotation longitudinally of the auxiliary frame through the lower side of the box and near to the first named shaft, a boring tool at the lower end of the shaft and means for advancing or retracting the bearing box and tool on the auxiliary frame, said means being adapted to be thrown out of operative action to permit the bearing box to freely slide upon the auxiliary frame in either direction.

9. A stump auger or drill comprising a base frame having opposed side and end members pivotally connected, an auxiliary frame pivoted to the forward end of the base frame and forming spaced tracks, a bearing block movable along the tracks, a cross member near the lower portion of the auxiliary frame, means at the opposite end of the base frame for adjusting the rear end of the auxiliary frame vertically to vary the inclination thereof, a crank shaft journaled in the box, an auger shaft journaled in the box and geared to the crank shaft, said auger shaft resting in said cross member near the lower end and adapted to carry a cutting tool at said end, and means for releasably retaining the journal box in a backward position on the frame.

10. A stump auger comprising a base frame tapered toward one end, an auxiliary frame pivoted to the narrow end of the first frame mentioned and forming spaced tracks, a bearing box movable along said tracks, a cross member near the lower portion of the auxiliary frame, means at the wide end of the base frame for adjusting the rear end of the auxiliary frame vertically to vary the inclination thereof, and a crank shaft journaled in the box beneath one side of the auxiliary frame, said box having a surrounding top flange with portions resting upon the top faces of the side portions of the auxiliary frame for sliding movement along the same, an auger shaft journaled in the box and geared to the crank shaft, said auger shaft resting in said cross member near its lower end and adapted to carry a suitable cutting tool at said end, said frames and supporting means for the auxiliary frame being adapted to be folded downwardly, the auxiliary frame folding within the base frame and cooperative and disengageable means between the auxiliary frame and the bearing box at the side of the frame opposite to the crank operating means for retracting the latter and the cutting tool or bit therewith.

WILLIAM HUGHES.